United States Patent [19]

Munz

[11] 4,055,985
[45] Nov. 1, 1977

[54] APPARATUS FOR TESTING THE SURFACE QUALITY OF A VESSEL MOUTH

[75] Inventor: Werner Munz, Obfelden, Switzerland

[73] Assignee: Emhart Zurich S. A., Zurich, Switzerland

[21] Appl. No.: 748,994

[22] Filed: Dec. 9, 1976

[30] Foreign Application Priority Data

Dec. 24, 1975 Switzerland .................... 16773/75

[51] Int. Cl.² ............................................. G01M 3/32
[52] U.S. Cl. ................................... 73/49.2; 73/49.8
[58] Field of Search .................. 73/49.2, 45.1, 45.2, 73/45.3, 49.8, 41, 37

[56] References Cited

U.S. PATENT DOCUMENTS

| 3,247,707 | 4/1966 | Tatro | 73/49.2 |
| 3,390,569 | 7/1968 | McMeekin | 73/49.8 |
| 3,496,761 | 2/1970 | Powers, Jr. | 73/45.2 |

Primary Examiner—Donald O. Woodiel
Attorney, Agent, or Firm—H. Samuel Kieser

[57] ABSTRACT

An apparatus for testing the surface quality of a vessel mouth including a test head adapted to be placed over the vessel mouth, a line connecting the test head to a supply of test gas, a passageway through the test head for introducing gas into the vessel, and a pressure measuring instrument connected to the gas line for generating an electrical signal when a pressure change of a predetermined tolerance value occurs. A sealing washer of spring stiffness is mounted on the test head for bearing against the vessel mouth and a valve is provided in the test head to open the passageway when the washer is pressed against the vessel and to close the passageway when the test head is removed from the vessel. In addition, the sealing washer and valve may be pivotable and means for generating a fault signal may be provided for generating a signal when the washer has been pivoted a predetermined amount.

10 Claims, 5 Drawing Figures

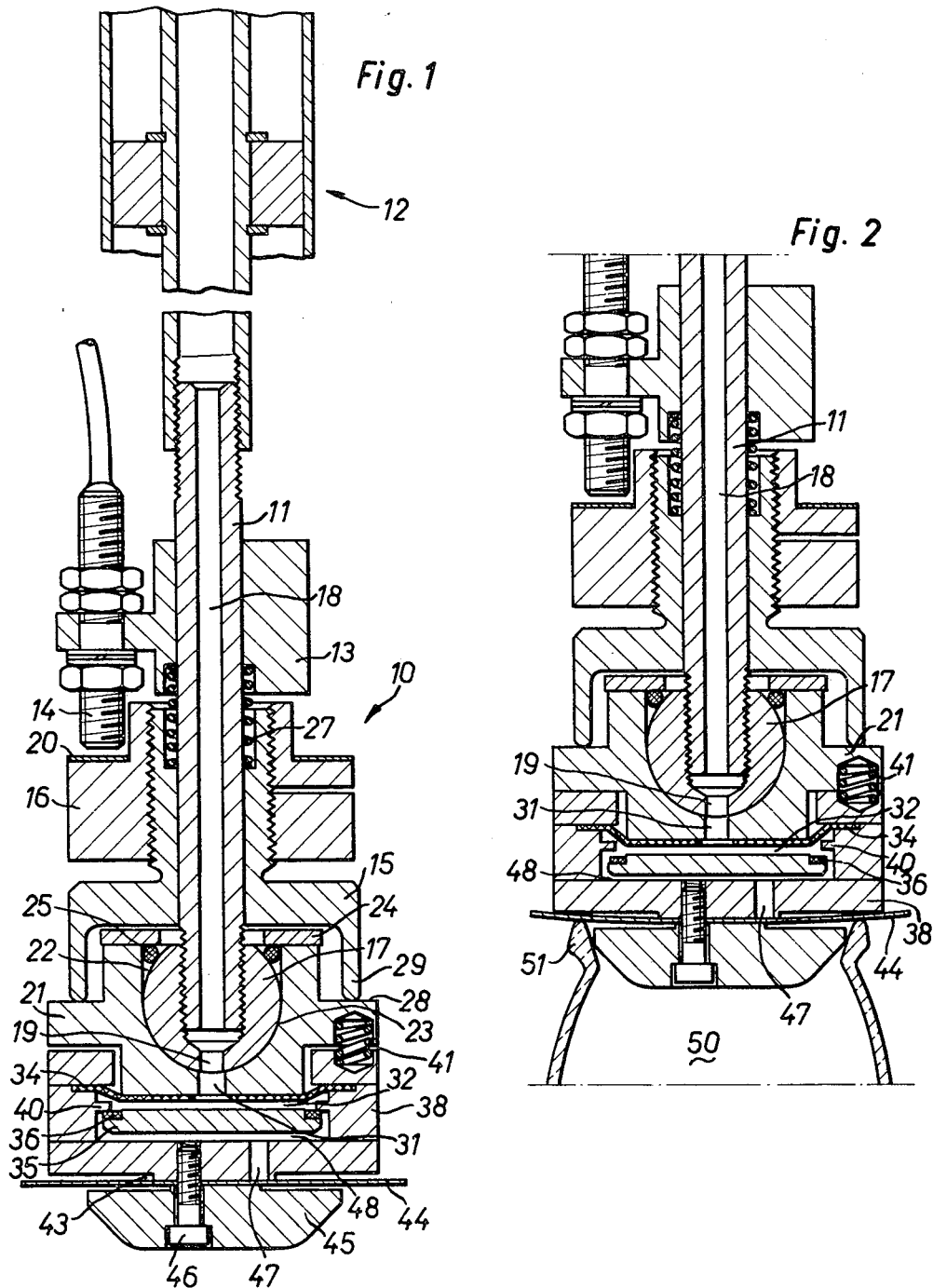

APPARATUS FOR TESTING THE SURFACE QUALITY OF A VESSEL MOUTH

BACKGROUND OF THE INVENTION

1. Field of the Invention

The present invention relates to an apparatus for testing the surface quality of a vessel mouth, especially on a glass vessel. The apparatus is of the type which comprises at least one test head intended to be temporarily mounted on the vessel mouth and which includes a centering piece adapted to be introduced into the vessel mouth; the apparatus is provided with a line which connects the test head to a source of gaseous medium and a pressure measuring appliance which is connected to this line and which generates an electrical signal when a pressure change in excess of a predetermined tolerance value occurs.

In the industrial production of glass vessels, the vessels, formed in a production plant, pass through a final inspection after cooling. In this inspection, those properties in particular of the vessels which are important to their intended use are tested. For the final inspection, automatic mechanical, electrical, pneumatic and optical testing appliances are used, which are combined into a testing sequence or train, commonly known as a sorting line. For the vessels of the type in which the mouth is to be closed airtight by a closure piece, it is necessary especially to test whether the surface of the mouth is sufficiently smooth and plane and is parallel to the bottom surface.

2. Description of the Prior Art

Many devices are already known, by which the quality of a vessel mouth can be tested. In the majority of these devices, a vertically slidable test head is lowered onto the vessel mouth during the test and the vessel is thereby closed. A vacuum or overpressure is then produced in the vessel and, during a predetermined period, it is observed whether the set vacuum or overpressure is maintained. Devices of this type operating with vacuum are described, for example, in Swiss Pat. No. 528,732 and U.S. Pat. No. 2,407,062, while devices operating with overpressure are described in Swiss Pat. No. 556,532 and U.S. Pat. No. 3,496,761. All of these known devices possess an annular seal, which is of a resilient material capable of adjustment and is pressed onto the vessel mouth to carry out the test. The annular seal adapts itself to small chips and depressions of the vessel mouth, with the result that such defects usually cannot be detected. The overpressure used for testing in these known devices is relatively high. This has the disadvantage that a relatively long time is necessary to fill the vessel up to test pressure. Furthermore, when high test pressures are used, the sensitivity of the test procedure is not very high. Finally, in the above-mentioned devices the test head is always rigidly attached to the sliding device, so that even a tolerable slope of the vessel mouth relative to the bottom face causes a fault signal, if it is not compensated by the resilient annular seal.

SUMMARY OF INVENTION

It is an object of the present invention to provide an improved apparatus for testing the surface quality of a vessel mouth wherein the disadvantage of the prior art are overcome.

In general, the apparatus of the present invention includes a test head adapted to be placed temporarily over the vessel mouth, means connecting the test head to a source of test gas, passage means through said test head for introducing gas into said vessel, and a pressure measuring instrument connected to said means connecting the test head to a source of test gas for generating an electrical signal when a pressure change of a predetermined tolerance value occurs.

The improvement comprises a washer of spring stiffness mounted on the test head and having a first surface for bearing against the vessel mouth. The test head includes a bearing surface against which the other surface bears. Valve means are provided in the test head for opening the passage means when the washer is pressed against a vessel mouth and closing the passage means when the test head is removed from the vessel.

The apparatus may further include a ball joint mounting the sealing washer and bearing surface for pivotable movement in any direction relative to the mounting of the test head.

In addition, the apparatus may include means for generating a fault signal when said sealing washer and said bearing surface have been pivoted beyond a predetermined amount.

The new apparatus makes possible the detecting of even extremely small chips or depressions in the vessel mouth, because the sealing washer of spring stiffness does not adjust to such faults. The new apparatus also enables the testing to be carried out with very low overpressure, which furthermore has the result that the filling time and thus also the testing time of the vessel can be shortened and the sensitivity of the testing procedure increased. The non-adjusting of the sealing washer to faults and the increase in sensitivity of the test enable a tolerance value to be laid down, within which small chips and depressions are still acceptable up to a quantitatively definable total cross-section. Finally, the pivotable arrangement of the sealing washer and the limiting of pivoting to an adjustable value also enable a tolerance value to be set for the parallelism between the mouth and the bottom face of the vessel.

DESCRIPTION OF THE DRAWINGS

FIG. 1 is a vertical sectional view through a preferred form of embodiment of the new test head, designed for testing wide-necked vessels, in the at-rest position;

FIG. 2 is a vertical sectional view through the lower part of the test head shown in FIG. 1 during the testing of a vessel having a faultless mouth;

DETAILED DESCRIPTION

Figure 3:
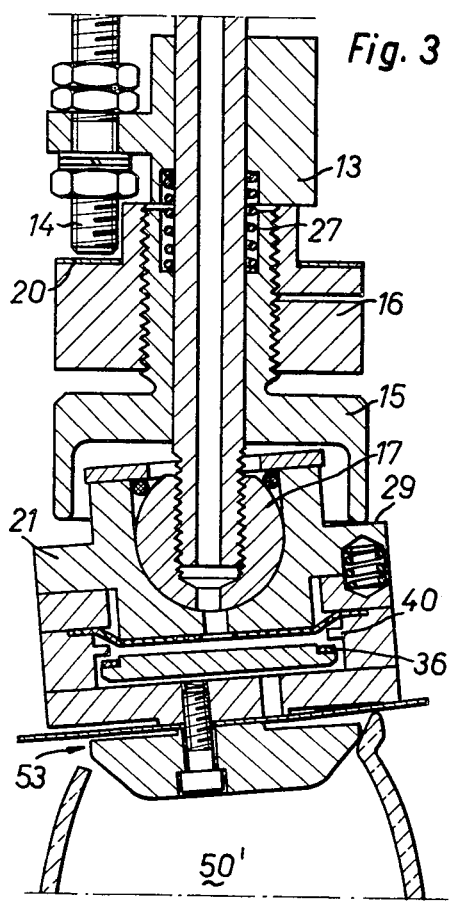
FIG. 3 is a vertical sectional view through the lower part of the test head shown in FIG. 1, during the testing of a vessel having a broken-away mouth, inclined relative to the base surface.

In the figures, the same references are used for the same components.

A preferred form of embodiment of the new apparatus contains a table and an assembly mounted above this. Above the table there runs a conveyor belt, forming the base of a continuous path for the vessels to be tested. The continuous path is bounded on one side by a guide bar and on the other side by a conveying screw, the axis of which is parallel to the continuous path. The axial distance between adjacent faces of the conveying screw exceeds the diameter of the vessels to be tested. The distance between the conveying screw and the guide bar can be adjusted. The conveying speed of the conveyor belt is greater than the speed of advance of the flanks of the conveying screw so that the vessels are always close up against the forward flank in the conveyed direction.

At least one test head is disposed in the assembly. If a number of test heads are provided, then the distance between the test heads is equal to the pitch of the conveying screw. Each test head is so mounted that it is lowered practically vertically at the feed end where the vessels enter, is then displaced during an adjustable period at a constant height above the base of the continuous path and synchronously with the conveying speed and in the conveying direction of the conveying screw, is then again raised and returned into its starting position.

It will be understood that the conveying screw can be changed, to adapt the distance between adjacent flanks to vessels possessing widely different diameters. It will be understood also that the distance between the table and the assembly can be varied, in order to lower the test heads onto vessels of differing heights and in order to adjust the pressure, under which the test heads are pressed onto the vessels.

Continuous paths with a conveying screw and with synchronized rotation of at least one test head are known and are described and illustrated, for example, in French Pat. No. 1,495,050 or in U.S. Pat. No. 3,496,761, for which reason a detailed description will not be repeated here.

The test head 10, shown in FIG. 1, comprises a guide shaft 11, which is vertically slidably journalled in a mounting 12. In the mounting 12, there is disposed a spring, not shown, against which the guide shaft 11 can be displaced upwards. An upper abutment piece 13, the lower face of which is formed as an abutment surface, is fixed to the guide shaft 11. A proximity switch 14 is fixed to the abutment piece 13. Below the abutment piece 13, there is disposed a bell 15, vertically slidable on the guide shaft 11. A flange 16, which can be fixed, is screwed onto the cylindrical shank of the bell 15. The uppermost flat surface of the flange 16 is formed as an abutment face which, when the bell 15 is displaced, is pushed up against the lower face of the abutment piece 13. The flange 16 also possesses a shoulder 20, which cooperates with the proximity switch 14, as will be described later. The lower surface of the abutment piece 13 and the upper flat surface of the cylindrical shank of the bell 15 each comprise an axial recess, in which a helical compression spring 27 is seated. A spherical hinge member 17 is screwed onto the lower end of the guide shaft 11. The guide shaft 11 and hinge member 17 include an axial bore 18 and 19 respectively, which is used as a duct for a test gas.

The test head 10 comprises also a support 21 possessing a central blind hole 22, the bottom of which is formed as a hemispherical hinge cup 23. The hinge member 17 is journalled in this hinge cup and forms together with it a ball joint, about which the support 21 can be pivoted in any direction. At the upper end of the support 21, a multi-part cover plate 24 is secured, the circular, inner opening of which has a small diameter than the blind hole 22. The cover plate 24, together with the adjacent edges of the blind hole 22, bounds a space in which is seated an O-ring 25. The O-ring 25 presses the hinge member 17 into the hinge cup 23, without impeding the mobility of the support 21 about the hinge member 17. The O-ring 25 also forms a seal, which effectively seals the passage constituted by the bores 18, 19 for the test gas against the external atmosphere, when the sealing effect between hinge member and hinge cup is not sufficient. The support 21 includes a shoulder 28, which cooperates with a downwardly projecting edge 29 of the bell 15, in order to limit the pivoting motion of the support.

The support 21 possesses also a central bore 31, formed as a blind hole, which is aligned with the bore 19 in the spherical hinge member 17, when the support is in the at-rest position shown in FIG. 1. The diameter of each of the bores 19 and 31 in the hinge member and in the support is sufficiently large for the opening between the two bores 19 and 31 not to be closed even when the support 21 is pivoted relative to the hinge member 17 as far as the designed limiting value. From the base of the bore 31, at least one further passage 32 leads radially outwards. Above this passage 32, the support possesses a recess, into which a flat, annular and laterally projecting seal 34 of elastic material is inserted. Beneath the passage 32, the support 21 terminates in a laterally projecting edge 35, on the surface of which towards the seal 34 is placed a further sealing ring 36.

The lower part of the support 17 is introduced into a multi-part sleeve 38. The inner face of the sleeve wall includes a groove, into which the outer edge of the annular seal 34 is inserted, and also an inwardly projecting flange 40, acting as valve ring, which is seated upon the sealing ring 36 used as a valve seat. Between the upper edge of the sleeve 38 and a radially, outwardly projecting flange of the support 17, three further springs 41 (only one of which is shown) preferably set at 120° intervals, are disposed, pressing the flange 40 of the sleeve onto the sealing ring 36. The external face of the bottom surface of the sleeve 38 possesses a central, downwardly projecting spacer piece 43, against which bears a spring-stiff sealing washer 44. Underneath the sealing washer 44, a centering piece 45 is disposed. The centering piece 45 is screwed by a screw 46 onto the base of the sleeve 38 and presses the sealing washer 44 onto the spacer piece 43. The base of the sleeve 38 and the sealing washer 44 each comprise at least one aligned bore 47, through which the space 48 between the internal surface of the base of the sleeve 38 and the lower face of the support 21 can be vented.

It will be understood that various attaching elements are necessary for securing the cover plate 24 onto the support 21 and for assembling the various parts of the sleeve 38. Because both the assembling of the above-described individual components and also the attaching elements necessary for this can be regarded as lying within the scope of the average skilled person, these details are neither described nor shown in the figures, in order to simplify the illustration.

When the new device is in operation, the bore 18 of the guide shaft 11 is connected via a pressure measuring instrument 60 to a source 61 for a test gas (FIG. 5), the pressure of which is higher than ambient pressure. The test gas fills the entire line 62, including the bores 18, 19, 31 in the guide shaft 11, the hinge member 17 and the support 21 and also the radially disposed passage 32, all being connected to the gas line. So long as the test head is not seated upon a vessel mouth, the gas line is closed by the seal 34 and the flange 40 seated upon the valve seat 36 (FIG. 1). When, during the already described cycle, the mounting 12 together with the test head 10 is lowered at the feed end of the continuous path onto the mouth of a vessel 50, the centering piece 45 is introduced into the vessel mouth (FIG. 2). The upper rim 51 of the vessel mouth then bears, along a virtually concentric, circular path, against the sealing washer 44. When the test head 16 is lowered further, the outer part of the sealing washer 44 is bent upwards, until it bears against the lower edge of the sleeve 38. If the test head 10 is lowered still further, then the sleeve 38 is raised against the force of the springs 41, and the flange 40 acting as a valve ring is also raised from the valve seat 36, until the upper edge of the sleeve 38 bears against the shoulder of the support 21. During this movement, the elastic seal 34 is deformed, without its sealing action being adversely affected. The test gas then flows through the opened valve 36, 40 into the space 48, and from there through the bore 47 into the vessel 50. If the plane of the vessel mouth is parallel to the vessel base, that is virtually horizontal, and if it possesses no chips or depressions, then the mouth is closed by the sealing washer 44, and the pressure in the vessel continues to rise until it has reached the same value as that in the line 62. If pressure balancing is reached to within an adjustable tolerance, then the pressure measuring instrument 60 does not generate any fault signal. After the predetermined measuring period has expired, the test head 10 is again raised from the vessel mouth. The spring-stiff sealing washer 44 then springs back into the position shown in FIG. 1, the springs 41 press the sleeve 38 sufficiently far downwards again for the flange 40, acting as valve seating, again to bear firmly against the sealing ring 36, and the passages 32, 31, 19, 18, which form the end of the duct 62 for the test gas, are again closed. The test head 10 is then conducted back again, as already described, to the feed side of the continuous path, and is lowered for the next test onto a vessel mouth.

If the test head 10 is placed on a vessel mouth which is inclined relative to the vessel base, then the part of the test head 10 hinged at the hinge member 17 is pivoted (FIG. 3). The shoulder 28 of the support 21 then pushes the bell 15 upwards against the resistance of the helical compression spring 27. If the inclination of the vessel mouth lies within the acceptable tolerance and the bell 15 is displaced by a correspondingly small amount, then the quality of the vessel mouth can be tested as already described, even when the support 21 and the sleeve 38 are pivoted. If the inclination of the vessel mouth exceeds the acceptable value and the bell 15 is displaced sufficiently far upwards for the upper abutment surface of the flange 16 to bear against the lower surface of the abutment piece 13, then the entire test head 10 can be displaced in its mounting 12. The distance between the upper abutment surface of the flange 16, screwed onto the bell 15, and the lower face of the abutment piece 13 is so adjusted that it is always somewhat larger than the distance between the shoulder 20 of the flange 16 and the proximity switch 14. The proximity switch 14 is so adjusted that it generates a fault signal before the abutment surface of the flange bears against the lower face of the abutment piece. As soon as the test is ended and the test head is raised from the vessel mouth, the spring 27 presses the bell 15 downwards again, the support 21 and sleeve 38 also being again pivoted into the starting position shown in FIG. 1.

If the test head is lowered onto a vessel mouth 50' which comprises a chip 53 or a corresponding depression (FIG. 3), then the vessel mouth is not closed by the spring-stiff sealing washer 44 in the region of this chip. The consequence is that the test gas which flows into the vessel, after the flange 40 used as valve ring has been raised from the sealing ring 36, escapes through the chip 53 or a corresponding depression. The pressure in the vessel then does not rise, but the pressure of the test gas in the line 62 falls. The pressure which falls or has fallen during the entire test time has the effect that the pressure measuring instrument 60 generates a fault signal which, in known manner, is used for rejecting the relevant vessel at the end of the continuous path.

Figure 4:
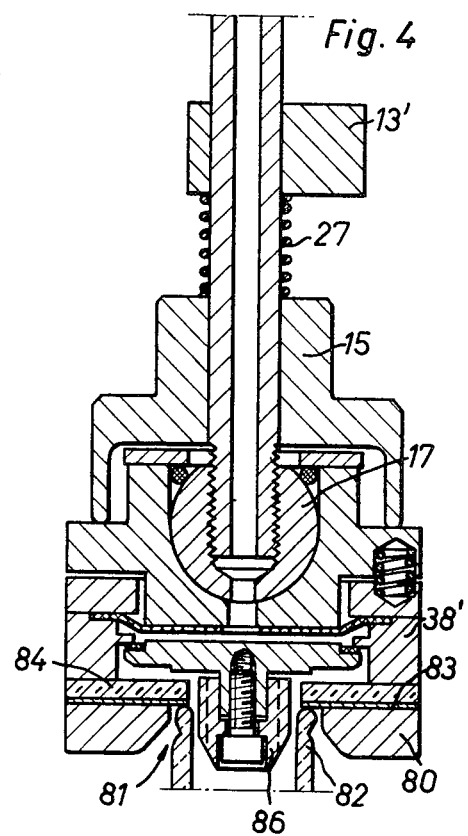
FIG. 4 is a vertical sectional view through the lower part of a preferred form of embodiment of the new test head, designed for testing narrow-necked vessels, in the at-rest position.

In FIG. 4, a form of embodiment of the new test head is shown, which is intended for narrow-necked vessels. This embodiment does not comprise any proximity switch, nor any flange screwed onto the bell 15. The abutment piece 13' attached to the guide shaft 11 serves only for the application of the one end of the helical compression spring 27. The hinge member 17, the support 21 and the valve arrangement 34, 36, 40 do not differ from those of the form of embodiment of FIG. 1. The base 80 of the multi-part sleeve 38' possesses a downwardly conically widening central opening 81, which is designed to receive the vessel mouth 82 to be tested. The spring-stiff sealing washer 83 is placed between the base 80 and the cylindrical part of the sleeve 38'. A hard rubber ring 84, which bears against the sealing washer, limits the bending of this washer. The centering piece 86 is secured to the edge 35 of the support 21.

The method of operation of this test head is the same as that described above for the form of embodiment shown in FIGS. 1–3 so that it will not be repeated in detail here.

Figure 5:
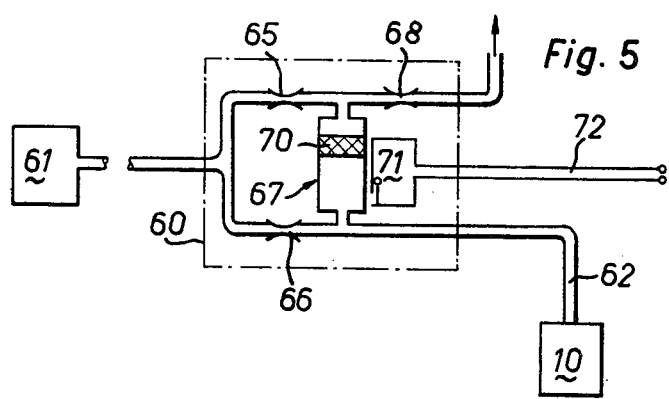
FIG. 5 is a schematic diagram of the test gas line with a pressure measuring appliance.

The pressure measuring instrument 60 shown in FIG. 5 contains two ducts, branched from the feed line, each of which comprises a restrictor 65, 66 respectively, disposed at the inlet end; these restrictors determine the flow rate of the test gas in the associated duct. The two ducts are connected, downstream of the restrictor at the inlet end, with the upper and lower chamber respectively of a pneumatic cylinder 67, having its axis vertical. The duct connected to the upper chamber of this cylinder possesses a restrictor 68 at the outlet end also and is open to the surrounding atmosphere at the downstream end of this restrictor. The duct leading into the lower chamber of the cylinder is connected directly to the line 62, which leads to the test head 10. In the cylinder 67, there is disposed a freely movable piston 70 of magnetic material and, parallel to the cylinder wall of the piston, there is a magnetically actuated electrical relay 71. Pressure measuring instruments of this type are commercially available.

When the device is in operation, the test gas source 61 supplies a test gas at virtually constant pressure, and the valve 40, 36, which closes the end of the line 62 in the test head 10, is closed. The test gas acting in the upper chamber of the pneumatic cylinder 67 then flows through the restrictors 65, 68 into the surrounding atmosphere, whereas the test gas acting in the lower chamber of the cylinder 67 produces a pressure which is practically the same as the pressure generated by the test gas source 61 and which drives the piston 70 upwards. In this position, the relay 71 is not in the range of action of the magnetic piston, and its contacts are opened. If, during testing of a vessel having a fault-free mouth, the valve in the test head is opened only briefly and thus the pressure in the line 62 and the lower chamber of the cylinder connected with it drops also only briefly and slightly, then the piston 70 descends also only for a short period and by a small amount, and the relat 71 is not influenced. If, by contrast, when testing a vessel having a faulty mouth, the pressure in the line 62 and in the lower part of the cylinder falls during the entire test period, then the magnetic piston also falls and closes the contacts of the relay 71. A measuring current circuit 72 is thus closed and generates the already mentioned fault signal.

It will be understood that the device also generates a fault signal when the vessel mouth is faultless, but the vessel comprises a hole in the bottom surface, the wall or the neck.

The device described above can be modified in many ways and adapted to special test conditions. It has already been mentioned that the assembly comprising the test heads can be adjusted in height, in order to test vessels of differing heights. It has also been mentioned already that the preferred form of embodiment of the apparatus comprises several, preferably two, test heads, which are disposed parallel to one another and cycle synchronously with one another and simultaneously test two vessels. The centering pieces 45, 86 are preferably replaceable, in order that the test head can be used for testing vessels having different mouth diameters.

It is furthermore possible to equip the apparatus with two differing test heads, of which the one is intended according to the present invention for testing the surface quality of a vessel mouth and the other for testing the internal and/or external diameter of the vessel mouth. Devices comprising test heads of the latter type are known to the person skilled in this field and described, for example, in French Patent Specification No. 1,495,050. With this form of embodiment it is possible to carry out two different test operations using the same apparatus, so that if a sorting line is equipped in this manner, considerable economic savings result.

In one practically proven form of embodiment of the new device, purified compressed air at a pressure of about 0.1 bars gauge is used as test gas. Testing is carried out during the passage of the vessels along the conveying path, so that there is no need to interupt the conveying of the vessels. The test period for each vessel, that is the time during which the test head is seated upon the vessel mouth, amounts to about 100 ms. With this device, which comprises only a single test head, it is possible for about 200 infant feeding vessels of 170 $cm^3$ capacity, or about 180 fruit juice bottles of about 1,000 $cm^3$ capacity to be tested per minute. In both vessels, the diameter of the mouth is about 500 mm. The spring-stiff sealing washer consists of spring strip steel and has a diameter of 60 mm and thickness of 0.3 mm. The force with which the test head is pressed onto the vessel mouth is about 2 kg. The height of the spacer piece 43 is preferably equal to the depth of an acceptable depression in the vessel mouth and in general is 0.5 mm.

What is claimed is:

1. In an apparatus for testing the surface quality of a vessel mouth, said apparatus including a test head adapted to be placed temporarily over the vessel mouth, means connecting the test head to a source of test gas, passage means through said test head for introducing gas into said vessel, and a pressure measuring instrument connected to said means connecting the test head to a source of test gas, said pressure measuring instrument adapted to generate an electrical signal when a pressure change of a predetermined tolerance value occurs, the improvement comprising:
   a. a sealing washer of spring stiffness mounted on said test head and having a first surface for bearing against the vessel mouth, said test head having a bearing surface against which the other surface of said washer bears, and
   b. valve means in said test head for opening the passage means when the washer is pressed against a vessel mouth and closing said passage means when the test head is removed from the vessel.

2. In the apparatus of claim 1, the improvement further comprising means mounting said sealing washer, bearing surface and valve means for pivotal movement in all directions.

3. In the apparatus of claim 2, the improvement further comprising means for generating a fault signal when the sealing washer bearing surface and valve means have pivoted a predetermined amount.

4. In the apparatus of claim 3, said means for generating a fault signal including a proximity switch and means having a shoulder thereon movable toward said proximity switch upon pivotable movement of said sealing washer, bearing surface and valve means.

5. In the apparatus of claim 1, said bearing surface being of annular shape having an internal diameter greater than the diameter of the vessel mouth to be tested.

6. In the apparatus of claim 1, said bearing surface being of circular shape and having an external diameter smaller than the diameter of the vessel mouth to be tested.

7. In the apparatus of claim 1, said valve means including an annular valve seat, a movable valve ring, and means bearing said valve ring against said valve seat in a direction opposite to the direction of the force exerted against the washer when the washer bears against the vessel.

8. In the apparatus of claim 7 wherein said annular valve seat is formed in a support member, said support member being received within a sleeve member having a bottom surface, said valve ring extending from the internal surface of said sleeve member and said bearing surface being formed on said bottom surface.

9. In the apparatus of claim 8, said support member being mounted on a ball member whereby said valve member, said bearing surface and said washer are pivotable in all directions.

10. In the apparatus of claim 8, the improvement further comprising means for generating a fault signal when said sealing washer, bearing surface and valve means have pivoted a predetermined amount, said means for generating a signal fault including a proximity switch, a bell-shaped member mounted for movement with respect to said proximity switch and said support member and having its projecting edge engaging said support member, and shoulder means on said bell member movable toward and away from said proximity switch upon pivotable movement of said support member, and means bearing said bell-shaped member away from said proximity switch into engagement with said support member.

* * * * *